United States Patent [19]

Menzenhauer

[11] 4,286,725
[45] Sep. 1, 1981

[54] VESSEL FOR COLLECTING AND EXTINGUISHING COMBUSTIBLE LIQUIDS

[75] Inventor: Paul Menzenhauer, Bruchsal, Fed. Rep. of Germany

[73] Assignee: Kernforschungszentrum Karlsruhe GmbH, Karlsruhe, Fed. Rep. of Germany

[21] Appl. No.: 946,871

[22] Filed: Sep. 29, 1978

[30] Foreign Application Priority Data

Oct. 1, 1977 [DE] Fed. Rep. of Germany ....... 2744267

[51] Int. Cl.³ .......................... A62C 1/18; A62C 3/06; G21C 9/04
[52] U.S. Cl. .................................. 220/23.2; 220/1 C; 176/37; 176/38
[58] Field of Search ..................... 220/1 C, 23.2, 23.8; 138/111; 176/38, 37; 184/106

[56] References Cited

U.S. PATENT DOCUMENTS

| 1,168,819 | 1/1916 | Mildt | 220/23.2 |
| 1,487,065 | 3/1924 | Irons | 220/1 C |
| 1,554,589 | 9/1925 | Long | 220/1 C |
| 1,571,049 | 1/1926 | Gatchell | 220/23.2 |
| 2,621,075 | 12/1952 | Sedar | 138/111 |
| 3,290,222 | 12/1966 | Schoessow | 176/38 |
| 3,693,824 | 9/1972 | Phillips | 220/23.2 |

FOREIGN PATENT DOCUMENTS

| 1608027 | 1/1974 | Fed. Rep. of Germany | 176/38 |
| 2633960 | 2/1977 | Fed. Rep. of Germany | 176/38 |
| 2614561 | 10/1977 | Fed. Rep. of Germany | 220/23.2 |

*Primary Examiner*—David H. Brown
*Assistant Examiner*—Edward F. Miles
*Attorney, Agent, or Firm*—Spencer & Kaye

[57] ABSTRACT

A vessel for collecting liquid has a plurality of juxtapositioned hollow bodies secured to one another to form an assembly. Each hollow body defines an essentially closed inner chamber separated from one another. There are further provided liquid-collecting grooves extending on a top external surface of the assembly. Each groove is defined by adjacent external surface portions of two adjoining hollow bodies. Drainage openings are provided in the hollow bodies within the confines of the grooves at the respective bottom thereof for maintaining communication between the respective grooves and the respective chamber therebelow.

3 Claims, 3 Drawing Figures

VESSEL FOR COLLECTING AND EXTINGUISHING COMBUSTIBLE LIQUIDS

BACKGROUND OF THE INVENTION

This invention relates to a vessel for collecting and extinguishing combustible liquids, particularly liquid metals, such as sodium or sodium-potassium used as a coolant in nuclear installations. The vessel has walls defining a tub-like chamber covered with a closure which is provided with an inclined surface or with liquid-collecting grooves. The closure has, at the base of the grooves, drainage openings leading into the tub.

In case leakage occurs in the liquid metal-cooled installations such as sodium-cooled nuclear reactors, a conflagration caused by a spontaneous ignition in case hot sodium contacts air, has to be prevented. The liquid metal that has escaped has to be collected and introduced, in a still warm condition, into storage tanks or removed together with the protective system.

SUMMARY OF THE INVENTION

It is an object of the invention to provide an improved collecting vessel for escaped liquid metal which is of very simple structure and which renders possible a rapid exchange of vessels after a leakage has occurred to thus ensure a rapid cleaning and resumption of the operation of the nuclear installation, such as a nuclear reactor.

This object and others to become apparent as the specification progresses, are accomplished by the invention, according to which, briefly stated, the vessel for collecting and extinguishing combustible liquids has a plurality of juxtapositioned hollow bodies secured to one another and constituting the vessel; each hollow body defines an essentially closed inner chamber separated from one another. There are further provided liquid-collecting grooves extending on a top external surface of the vessel. Each groove is defined by adjacent external surface portions of two adjoining hollow bodies. Drainage openings are provided in the hollow bodies within the confines of the grooves at the respective bottom thereof. The drainage openings maintain communication between the respective grooves and the respective chamber therebelow.

According to a particularly advantageous feature of the invention, the hollow bodies are tubes of circular, oval or other desired cross section which are juxtapositioned in a laterally adjoining series and welded to one another and further have drainage openings immediately above the weld seams in the bottom zone of the groove-like depressions defined by the upper, outer face of adjoining tubes.

According to a further feature of the invention, on the upper portion of the hollow bodies, for example, at the apex of the tubes, the tube wall is provided with vents, constituted, for example, by stand pipes communicating with the inside of the tubes. Further, the end faces of the hollow bodies (tubes) are sealingly closed with lid members.

The particular advantage of the invention resides principally in the significant structural and constructional economy as compared to the conventional flat pan vessels with loose lids. A particularly large load capacity is achieved by virtue of the significant rigidity of the tubes. In this manner carrier structures which have been necessary, for example, in flat collecting pans, can be dispensed with. Further, in case of a leakage accident, the invention provides that the collecting system can be replaced very rapidly and in a simple manner.

DESCRIPTION OF THE PREFERRED EMBODIMENT

Figure 1:
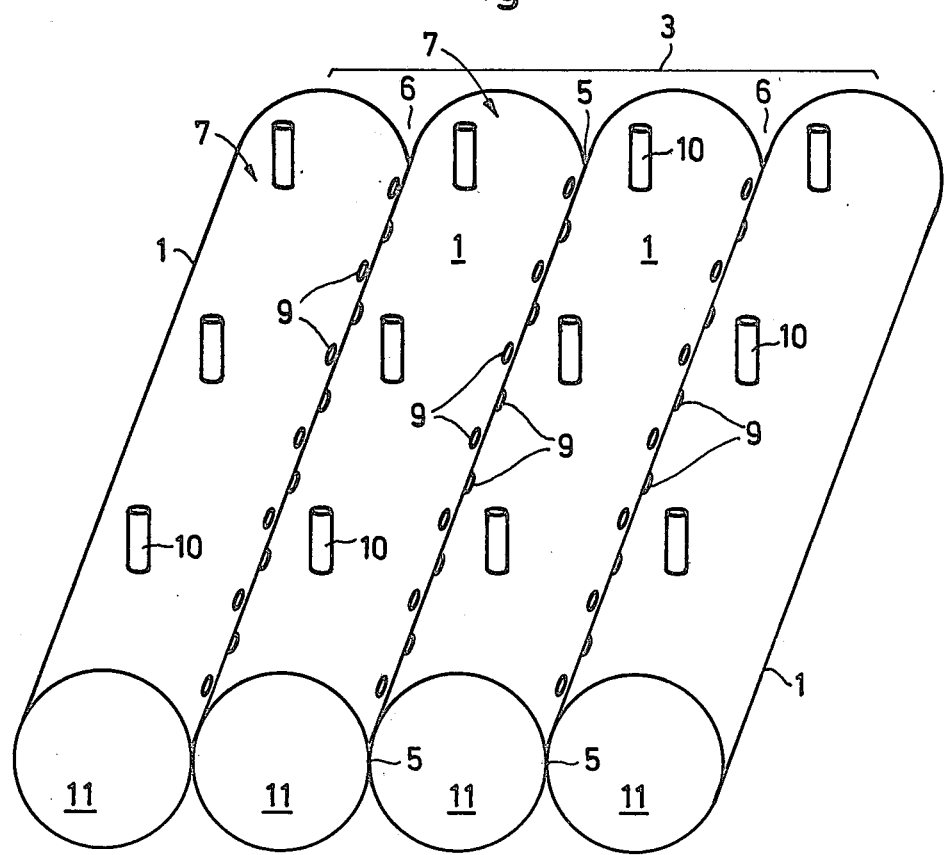
FIG. 1 is a schematic perspective view of a preferred embodiment of the invention.
Figure 2:
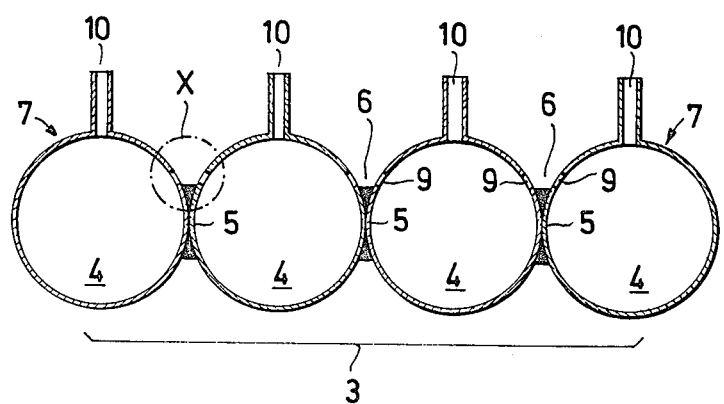
FIG. 2 is a schematic sectional front elevational view of the same embodiment.
Figure 3:
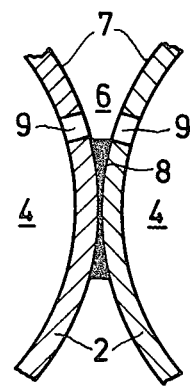
FIG. 3 is an enlarged sectional front elevational view of the detail of inset "X" of FIG. 2.

Turning now to FIGS. 1 and 2, a plurality of elongated hollow bodies, such as tubes 1 are juxtapositioned in a laterally adjoining series and welded to one another at adjacent portions of the outer faces 7 of the tube walls 2, whereby a raft-like structure 3 having a plurality of chambers 4 is obtained. The tubes 1 have a circular cross section; it is to be understood, however, that the cross section may be oval, or may have some other desired shape, so that each hollow body has an outer upper surface which slopes downwardly in a direction transverse to the length dimension of the body. The cross-sectional shape of the hollow bodies (tubes) has to be such that at the locations of contact 5 between adjoining tubes their outer surface portions together define groove-like depressions or troughs 6 extending in the length dimension of the tubes. At the base of the groove-like depressions 6, immediately above the weld seams 8, the walls 2 are provided with drainage openings 9 by means of which the depressions 6 communicate with the chambers 4.

To the apical portions of the tubes 1 vertically upwardly oriented vent pipes 10 are welded which, by means of respective openings in the tube walls 2, communicate with the chamber 4 below.

The end faces 11 of the tubes 1 are sealingly closed off by lids so that a hermetically closed chamber system is formed which communicates with the ambient atmosphere only through the openings 9 and the vent pipes 10. The chambers 4 may be further subdivided into subchambers by means of partitions (not shown), with each of which there is associated at least one drainage opening 9.

The entire assembly 3 is, at its underside, provided with rollers (not shown) or is positioned on rollers, by means of which it is readily displaceable and can, at any time, be moved underneath the danger areas and, after it served its purpose, it can be easily replaced. It is further expedient to arrange the assembly 3 in a tilted orientation towards one of its end faces or to so structure the assembly that the tubes slope downwardly towards the middle from opposite end faces to ensure an improved withdrawal of the liquid from the chambers 4, for example, into storage tanks.

It is thus a function of the collecting device according to the invention to prevent, in case of leakage, for example, in liquid metal-cooled installations, a conflagration by collecting the escaping liquid metal in the groove-like depressions 6 from which the liquid is drained through the openings 9 into the chambers 4 in which, due to lack of oxygen, the fire that is spontaneously ignited when the escaped liquid metal has contacted air, is extinguished. It is feasible to provide the vessel structured according to the invention in a closed system as a collecting apparatus in all areas where an escape of liquid metal may take place. The vessels may be positioned loosely or shiftably to thus be replaceable or may also be installed in a fixed, stationary manner.

It is to be understood that the above description of the present invention is susceptible to various modifications, changes and adaptations, and the same are intended to be comprehended within the meaning and range of equivalents of the appended claims.

I claim:

1. A vessel for collecting liquid, comprising a plurality of hollow bodies each having a length dimension: said hollow bodies being arranged side-by-side parallel to their length dimension and being secured to one another to form an assembly; each said hollow body defining an enclosed inner chamber for accommodating the liquid; the chambers of the respective hollow bodies being separated from one another; each hollow body having an outer upper surface inclined downwardly in a direction transverse to said length dimension; the inclined upper surfaces of any two adjoining hollow bodies together form a trough extending parallel to said length dimension; each trough having a bottom and drainage openings at said bottom for providing passage of the liquid from each trough into said inner chambers underneath the respective troughs; each hollow body further having an external apical portion; and further comprising a vent pipe secured to each hollow body in said apical portion thereof and extending vertically upwardly from said apical portion; each vent pipe defining a vent opening maintaining communication between the respective inner chamber and the ambient atmosphere.

2. A vessel as defined in claim 1, wherein said hollow bodies are tubes disposed in a laterally adjoining series; said tubes being secured to one another by welds along external surface portions of said tubes; said welds constituting said bottom; said drainage openings being situated immediately adjacent said welds.

3. A vessel as defined in claim 2, further comprising closure members sealingly closing off ends of each tube.

* * * * *